US011291086B2

(12) United States Patent
Yasutake et al.

(10) Patent No.: US 11,291,086 B2
(45) Date of Patent: Mar. 29, 2022

(54) HEATING APPARATUS AND HEATING METHOD

(71) Applicant: NETUREN CO., LTD., Tokyo (JP)

(72) Inventors: Hidehiro Yasutake, Tokyo (JP); Yoshimasa Tanaka, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 190 days.

(21) Appl. No.: 15/323,520

(22) PCT Filed: Jul. 9, 2015

(86) PCT No.: PCT/JP2015/003482
§ 371 (c)(1),
(2) Date: Jan. 3, 2017

(87) PCT Pub. No.: WO2016/006253
PCT Pub. Date: Jan. 14, 2016

(65) Prior Publication Data
US 2017/0150553 A1     May 25, 2017

(30) Foreign Application Priority Data

Jul. 10, 2014  (JP) .............................. JP2014-142614
Jul. 10, 2014  (JP) .............................. JP2014-142615

(51) Int. Cl.
*H05B 6/10*     (2006.01)
*H05B 6/36*     (2006.01)
(Continued)

(52) U.S. Cl.
CPC .............. *H05B 6/103* (2013.01); *C21D 1/42* (2013.01); *H05B 6/101* (2013.01); *H05B 6/365* (2013.01);
(Continued)

(58) Field of Classification Search
None
See application file for complete search history.

(56) References Cited

U.S. PATENT DOCUMENTS 2,349,813 A * 5/1944 Denneen ................... H05B 6/06
                                                              219/639
2,428,303 A * 9/1947 Wood ...................... H05B 6/405
                                                              219/640
(Continued)

FOREIGN PATENT DOCUMENTS

DE     102007019171 A1 * 10/2008 ............... C21D 1/10
GB          979069            1/1965
(Continued)

OTHER PUBLICATIONS

International Search Report dated Dec. 2, 2015 in International Application No. PCT/JP2015/003482.
(Continued)

*Primary Examiner* — Ibrahime A Abraham
*Assistant Examiner* — Elizabeth M Sims
(74) *Attorney, Agent, or Firm* — Wenderoth, Lind & Ponack, L.L.P.

(57) ABSTRACT

A heating apparatus and a heating method are provided. The heating apparatus includes a coil configured to receive AC power to form a magnetic field that inductively heats a workpiece, a spray unit configured to spray cooling fluid including a liquid to the coil in a form of mist at least during a period in which the AC power is supplied to the coil. Alternatively, the spray unit may be configured to spray the cooling fluid in the form of mist to a heating target portion of the workpiece placed in the magnetic field at least during the period in which the AC power is supplied to the coil.

7 Claims, 10 Drawing Sheets

(51) Int. Cl.
*H05B 6/42* (2006.01)
*C21D 1/42* (2006.01)
*C21D 1/10* (2006.01)
*C21D 1/667* (2006.01)
*H05B 6/44* (2006.01)

(52) U.S. Cl.
CPC ............ *H05B 6/42* (2013.01); *H05B 6/44* (2013.01); *C21D 1/10* (2013.01); *C21D 1/667* (2013.01); *H05B 2213/04* (2013.01); *Y02P 10/25* (2015.11)

(56) References Cited

U.S. PATENT DOCUMENTS

| | | | | |
|---|---|---|---|---|
| 2,644,075 | A * | 6/1953 | Corteggiano | H05B 6/103 219/637 |
| 3,532,333 | A * | 10/1970 | Dehn | H05B 6/06 148/569 |
| 3,593,973 | A | 7/1971 | Dehn | |
| 4,082,577 | A | 4/1978 | Heller | |
| 5,382,306 | A * | 1/1995 | Plata | B05B 7/0884 148/511 |
| 6,821,363 | B1 * | 11/2004 | Leissner | C21D 1/10 148/570 |
| 2005/0006828 | A1 * | 1/2005 | Streubel | B60J 5/042 266/104 |
| 2011/0248023 | A1 * | 10/2011 | Doyon | C22C 38/00 219/632 |
| 2015/0028023 | A1 | 1/2015 | Tanaka et al. | |

FOREIGN PATENT DOCUMENTS

| | | | | |
|---|---|---|---|---|
| JP | 51-66221 | | 6/1976 | |
| JP | 59064716 | A * | 4/1984 | ............ C21D 9/28 |
| JP | 63-153499 | | 10/1988 | |
| JP | 05-015969 | | 1/1993 | |
| JP | 2000003779 | A * | 1/2000 | .......... B21B 45/004 |
| JP | 2000-303117 | | 10/2000 | |
| JP | 2001-291578 | | 10/2001 | |
| JP | 2003306714 | A * | 10/2003 | |
| JP | 2003306716 | A * | 10/2003 | |
| JP | 2003313611 | A * | 11/2003 | .......... B21B 45/004 |
| JP | 2005-320626 | | 11/2005 | |
| JP | 2006-009043 | | 1/2006 | |
| JP | 2013-091839 | | 6/2013 | |
| JP | 2013-182840 | | 9/2013 | |
| JP | 5504516 | | 5/2014 | |

OTHER PUBLICATIONS

Written Opinion of the International Searching Authority dated Dec. 2, 2015 in International Application No. PCT/JP2015/003482.
Office Action dated Jun. 2, 2021 in Chinese Patent Application No. 201580037486.9, with English-language translation.
Zhou, Hongzhang et al., "Contemporary Aluminum Alloy Plate Strip Investment and Design, Technology and Equipment, Product and Market", Metallurgical Industry Press, Apr. 2012, pp. 1-454, with English-language translation of pp. 218-220.
Office Action dated Aug. 19, 2021 in Chinese Patent Application No. 201580037486.9, with English-language translation.

* cited by examiner

QUENCH-HARDENED LAYER

FIG. 5B

QUENCH-HARDENED LAYER

FIG. 5C

QUENCH-HARDENED LAYER

FIG. 5D

QUENCH-HARDENED LAYER

QUENCH-HARDENED LAYER

HEATING APPARATUS AND HEATING METHOD

TECHNICAL FIELD

The present invention relates to a heating apparatus and a heating method for inductively heating a workpiece.

BACKGROUND ART

In a related art heat treatment, a workpiece is inductively heated by a magnetic field formed by a coil to which AC power is supplied.

In induction heating, lubricant for processing a workpiece, scales (oxide layer) formed on a heated surface of the workpiece and the like are attached to a coil. When the scales are deposited on the coil, for example, a short circuit may occur between the coil and the workpiece through the scales, thereby damaging the workpiece or the coil.

Therefore, according to a related art induction heating apparatus, at the time when cooling fluid is sprayed to a workpiece after heating is completed, cooling fluid such as water is also sprayed to a coil so that scales attached to the coil are removed (see, e.g., JP 5504516 B2).

In this induction heating apparatus, in order to prevent temperature unevenness of the workpiece due to the cooling fluid sprayed to the coil being scattering onto the workpiece under heating, the cooling fluid is sprayed to the coil after the heating of the workpiece is completed and the workpiece is taken out of the coil.

When inductively heating an elongated workpiece continuously by relatively moving the coil with respect to the workpiece that is being fed in a longitudinal direction of the workpiece, a corresponding time is required until the heating of the workpiece is completed. If the scales are not removed by spraying the cooling fluid during the heating, the scales are deposited on the coil and the workpiece or the coil may be damaged due to a short circuit.

Coils are formed in accordance with a workpiece. There are various shapes of a workpiece. Sometimes, a heating target portion of a workpiece includes a portion that can be easily overheated, such as a corner, a protrusion, or a hole. In order to prevent local overheating in the heating target portion, generally, the coil is designed to have a suitable shape and/or a magnetic shield is used to control heating temperature of each location on the heating target portion, but this causes an increase in manufacturing cost of the coil or complication of facilities.

SUMMARY OF INVENTION

It is an object of the present invention to provide a heating apparatus and a heating method which can protect a coil.

Another object of the invention is to provide a heating apparatus and a heating method which can adjust a heating temperature distribution in a heating target portion of a workpiece with a simple configuration.

According to an aspect of the present invention, a heating apparatus includes a coil configured to receive AC power to form a magnetic field that inductively heats a workpiece, and a spray unit configured to spray cooling fluid including a liquid to the coil in a form of mist at least during a period in which the AC power is supplied to the coil.

According to another aspect of the present invention, a heating method includes inductively heating a workpiece with a magnetic field formed by a coil to which AC power is supplied, and spraying cooling fluid including a liquid to the coil in a form of mist at least during a period in which the AC power is supplied to the coil.

According to another aspect of the present invention, a heating apparatus includes a coil configured to receive AC power to form a magnetic field that inductively heats a workpiece, and a spray unit configured to spray cooling fluid including a liquid to a heating target portion of the workpiece placed in the magnetic field in a form of a mist at least during a period in which the AC power is supplied to the coil.

According to another aspect of the present invention, a heating method includes inductively heating a workpiece with a magnetic field formed by a coil to which AC power is supplied, and spraying cooling fluid including a liquid to a heating target portion of the workpiece placed in the magnetic field in a form of mist at least during a period in which the AC power is supplied to the coil.

DESCRIPTION OF EMBODIMENTS

Hereinafter, embodiments of the invention will be described with reference to the drawings.

Figure 1:
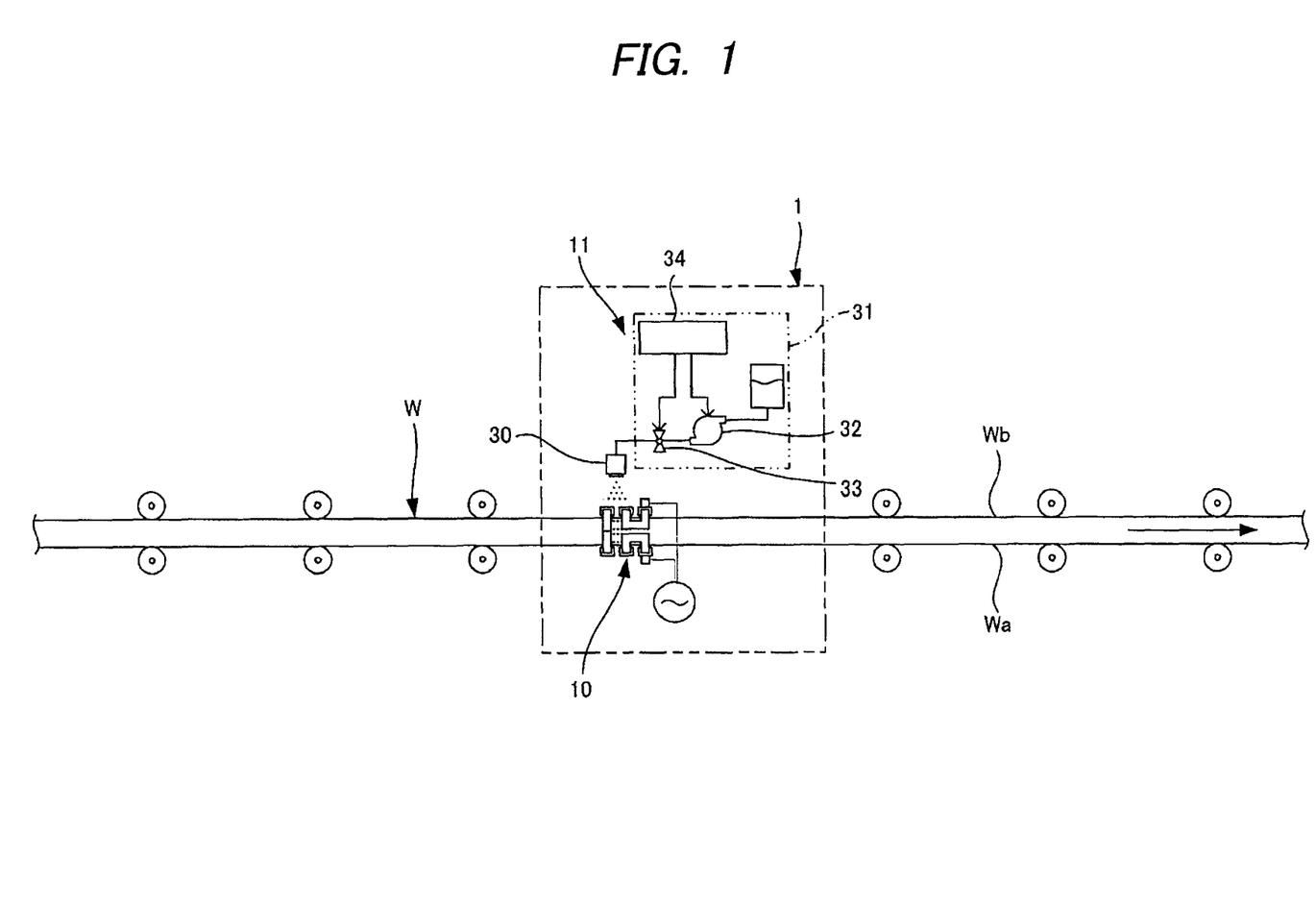
FIG. 1 is a diagram schematically illustrating a configuration of an example of a heating apparatus according to an embodiment of the invention.

FIG. 1 is a diagram schematically illustrating a configuration of an example of a heating apparatus according to an embodiment of the invention.

The heating apparatus 1 illustrated in FIG. 1 is configured to inductively heat an elongated workpiece W, and includes a coil 10 configured to inductively heat the workpiece W and a spray unit 11.

The workpiece W is a rectangular member having a rectangular cross-sectional shape, and right and left side surfaces Wa, Wb of the workpiece W are subject to heated. The shape of the workpiece W is not particularly limited, and the workpiece W may be a round bar or a pipe member having a rectangular cross-sectional shape or a circular cross-sectional shape. The entire outer circumferential portion of the rectangular workpiece W may be heated.

Since the elongated workpiece W is typically molded by drawing a material using a dice, burrs and bonderizing residues are attached to the workpiece W with the drawing process.

As shown in FIG. 1, the workpiece W is fed in the longitudinal direction by a conveyor and is continuously put into the heating apparatus 1. The heating apparatus 1 is configured to supply AC power to the coil 10 and to inductively heat the workpiece W continuously while relatively moving the coil 10 in the feeding direction of the workpiece W.

The spray unit 11 has a nozzle 30 configured to spray cooling fluid including a liquid in a form of mist and a supply unit 31 configured to supply the cooling fluid to the nozzle 30.

Spraying of the cooling fluid in the form of mist means that the cooling fluid is sprayed as fine particles which can float in the atmosphere.

The supply unit 31 includes a pump 32 configured to pressurize the cooling fluid, a valve 33 configured to cut off the supply of the cooling fluid to the nozzle 30, and a control unit 34. The control unit 34 is configured to drive the pump 32 so as to spray the cooling fluid from the nozzle 30 at least during a period in which the AC power is supplied to the coil 10 and to open and close the valve 33.

Under the driving control of the pump 32 and the opening and closing control of the valve 33 by the control unit 34, particles of the cooling fluid sprayed from the nozzle 30 are sprayed to the coil 10 supplied with the AC power and emitting heat and to a heating target portion of the workpiece W placed and heated in a magnetic field formed by the coil 10.

Figure 2:
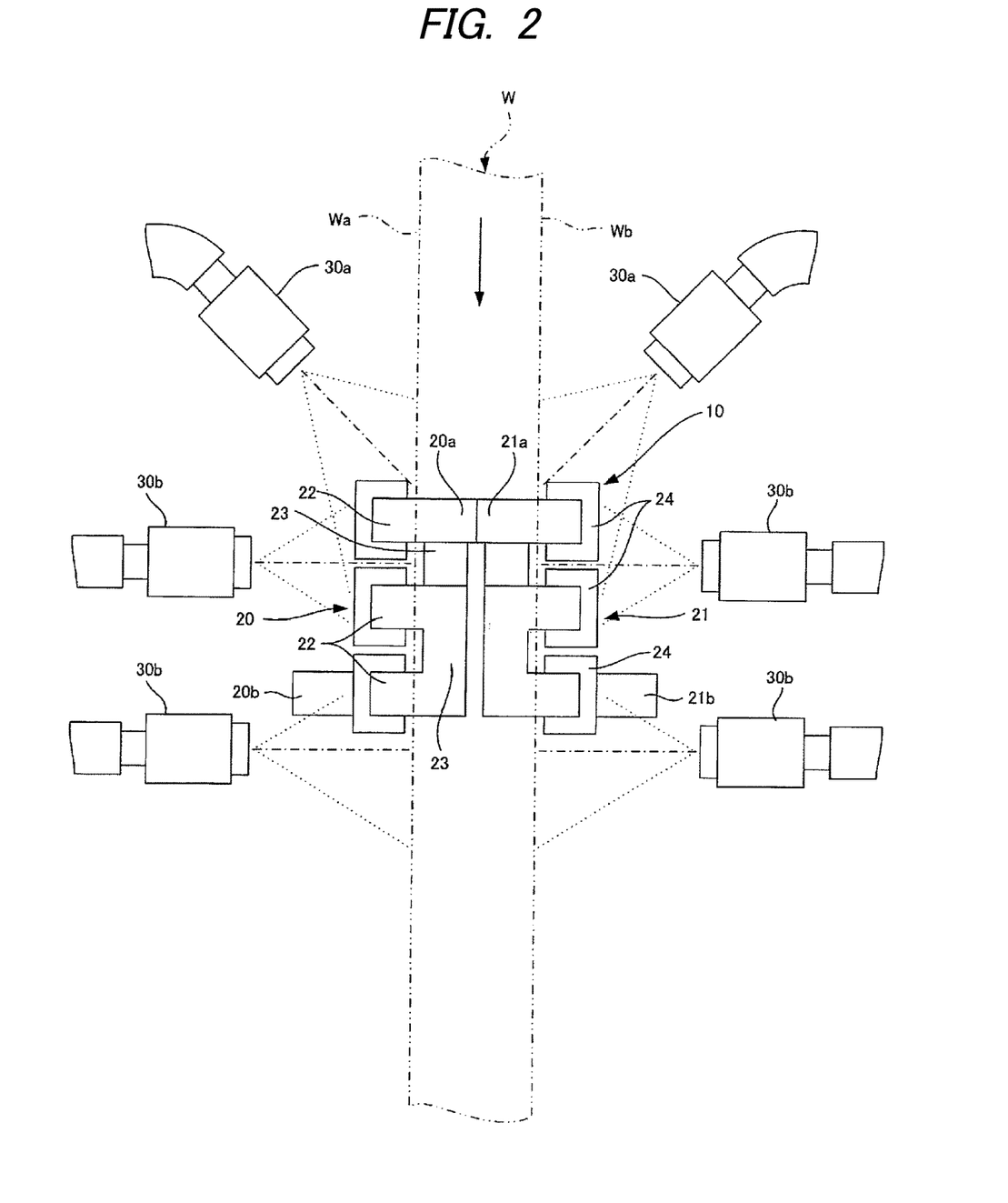
FIG. 2 is a diagram illustrating a configuration of the heating apparatus of FIG. 1.
Figure 3:
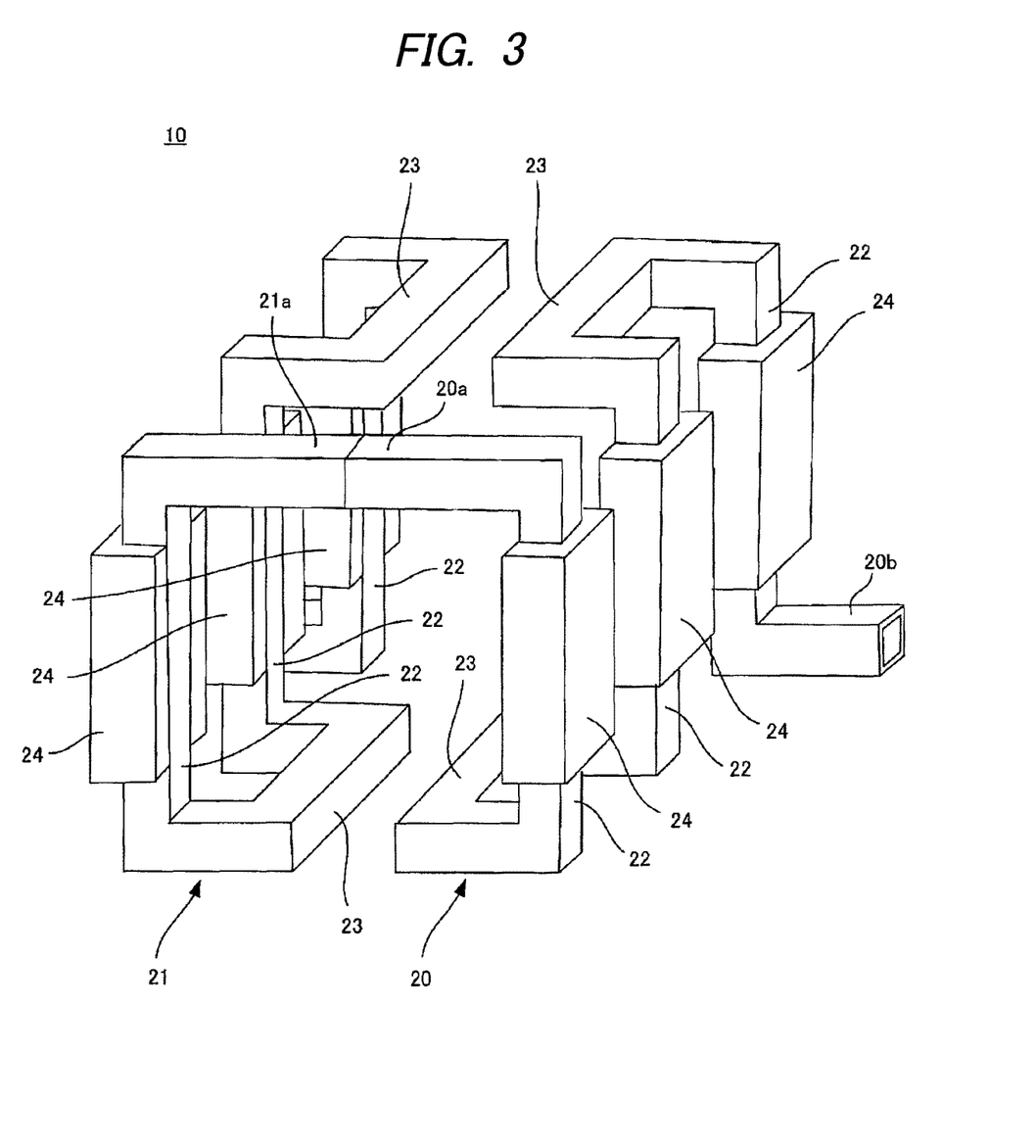
FIG. 3 is a perspective view of a coil of the heating apparatus.
Figure 4:
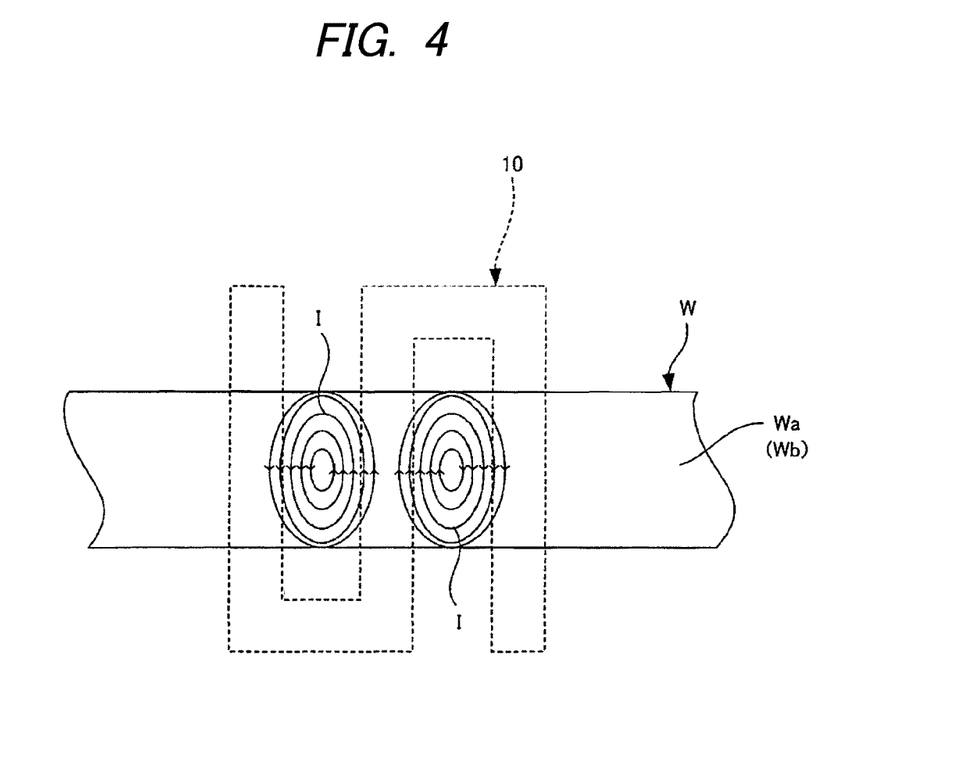
FIG. 4 is a diagram illustrating eddy current flowing in a workpiece during induction heating using the coil of FIG. 3.

FIG. 2 illustrates the configuration of the heating apparatus 1, FIG. 3 illustrates the configuration of the coil 10, and FIG. 4 illustrates eddy currents flowing in the workpiece W.

The coil 10 is formed to have a suitable structure depending on the workpiece W. In this example in which the right and left side surfaces Wa, Wb of the rectangular workpiece W are subject to heating, the coil 10 includes a first heating section 20 provided along one side surface Wa and a second heating section 21 provided along the other side surface Wb.

The first heating section 20 includes a plurality of heating conductor portions 22 arranged substantially perpendicular to the longitudinal direction of the workpiece W and a plurality of connecting conductor portions 23 connecting the ends of two heating conductor portions 22 adjacent to each other in the longitudinal direction, such that the conductor portions are provided to meander along the longitudinal direction of the workpiece W. The second heating section 21 also includes a plurality of heating conductor portions 22 and a plurality of connecting conductor portions 23, and is substantially symmetric with the first heating section 20.

One end 20a of the first heating section 20 and one end 21a of the second heating section 21 are electrically connected to each other. The other end 20b of the first heating section 20 and the other end 21b of the second heating section 21 are connected to a power supply, and the AC current flows in the first heating section 20 and the second heating section 21.

When the AC current flows in the first heating section 20 and the second heating section 21, an alternating magnetic field is formed around the heating conductor portions 22 or the connecting conductor portions 23. The magnetic flux of the alternating magnetic field formed around the heating conductor portions 22 is interlinked with the side surface Wa or the side surface Wb of the workpiece W, an eddy current I is generated in the interlinked part of the side surface Wa or the side surface Wb, and the interlinked part (heating target portion) is heated.

In the illustrated example, a core 24 is mounted on each heating conductor portion 22. The core 24 adjusts enlargement of the magnetic flux of the magnetic field formed around the corresponding heating conductor portion 22 and concentrically interlinks the magnetic flux with the heating target portion of the workpiece W, thereby enhancing heating efficiency of the heating target portion.

The conductor portions 22, 23 are formed of a tubular member, and a flow passage is formed in the first heating section 20 and the second heating section 21. A cooling fluid such as water flows through the insides of the first heating section 20 and the second heating section 21 emitting heat by flowing of a current therein, and the heating sections are cooled from the insides.

The number or arrangement of nozzles 30 that spray the cooling fluid in the form of mist is appropriately set depending on the coil 10 or the workpiece W. In the illustrated example, plural nozzles are formed to be substantially symmetric on both sides of the coil 10, and include nozzles 30a disposed upstream from the coil 10 in the feeding direction of the workpiece W and nozzles 30b disposed in the back of the coil 10.

The spray direction of the nozzles 30a disposed upstream from the coil 10 in the feeding direction of the workpiece W is directed to a gap between the first heating section 20 of the coil 10 and the workpiece W or a gap between the second heating section 21 of the coil 10 and the workpiece W.

Particles of the cooling fluid sprayed in the form of mist from the nozzles 30a and 30b are abundant around the coil 10 and the heating target portion of the workpiece W and cool the coil 10 or the heating target portion of the workpiece W from the outer surfaces thereof.

A current flowing in the coil 10 tends to flow on the outer surface side of the coil 10 due to a skin effect or a proximity effect at high frequencies. Accordingly, the temperature on the outer surface side of the coil 10 is likely to relatively rise. Therefore, by cooling the coil 10 from the outer surface thereof using the particles of the cooling fluid abundant around the coil 10, it is possible to effectively cool and protect the coil 10 and thus to extend the lifespan of the coil 10.

Scales or bonderizing residues detached from the workpiece W are captured by the cooling fluid in the form of mist abundant around the coil 10 and the scales or the like are prevented from being attached to the coil 10. Accordingly, it is possible to prevent damage of the coil 10 or a short circuit between the coil 10 and the workpiece W due to deposition of the scales or the like and thus to protect the coil 10.

From the viewpoint of preventing attachment of scales or the like to the coil 10, as in the illustrated example, it is preferable that the nozzles 30a be formed of which the spray direction is directed to the gap between the coil 10 and the workpiece W. According to this configuration, it is possible to effectively remove the burrs or bonderizing residues attached to the workpiece W or scales attached to the coil 10 actively using floating of the particles of the sprayed cooling fluid. Particularly, in the coil 10 including the cores 24, burrs are attached to the open end face of the core 24 facing the heating target portion of the workpiece W, but it is possible to effectively remove the burrs attached to the core 24 actively using floating of the particles of the cooling fluid which has been sprayed in the form of mist.

This method of cooling the coil 10 in the period in which AC power is supplied to the coil 10 and removing scales attached to the coil 10 by spraying the cooling fluid to the coil 10 in the form of mist is particularly useful in a case in which an elongated workpiece W is inductively heated continuously.

On the other hand, the heating target portion of the workpiece W is also cooled from the outer surface side by the particles of the cooling fluid which is abundant around the heating target portion. Since the particles of the cooling fluid which has been sprayed in the form of mist have very small heat capacity and vaporization heat which is taken from the heating target portion by the particles of the cooling fluid is also very small, the heating target portion is not excessively cooled by contact with the particles of the cooling fluid which has been sprayed in the form of mist.

The eddy current flowing in the heating target portion of the workpiece W tends to flow on the outer surface side of the heating target portion in the same way as the current flowing in the coil 10 and the temperature on the outer surface side of the heating target portion is likely to relatively rise. Therefore, by cooling the heating target portion from the outer surface side thereof using the particles of the cooling fluid which is abundant around the heating target portion of the workpiece W, it is possible to prevent coarsening of crystal grains on the outer surface side, for example, by making the heating temperature on the outer surface side and the inside of the heating target portion uniform.

By adjusting the spray direction or the sprayed amount of the cooling fluid which has been sprayed in the form of mist, it is possible to actively adjust the heating temperatures of the parts of the heating target portion of the workpiece W as illustrated in FIGS. 5A to 5D.

FIGS. 5A to 5D schematically illustrate hardening patterns of the workpiece W in a quenching process. In the examples illustrated in FIGS. 5A to 5D, it is assumed that the entire outer circumference of the workpiece W is heated using an annular heating coil C.

Figure 5A:
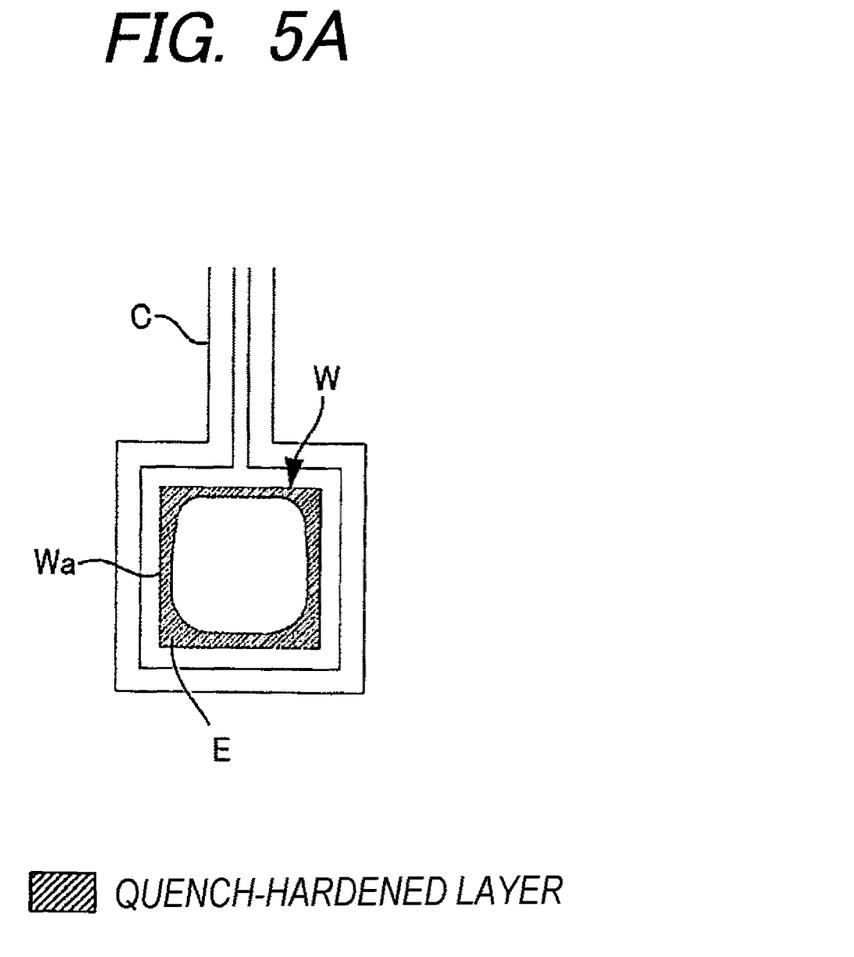
FIG. 5A is a diagram schematically illustrating a hardening pattern of a workpiece in a quenching process.
Figure 5B:
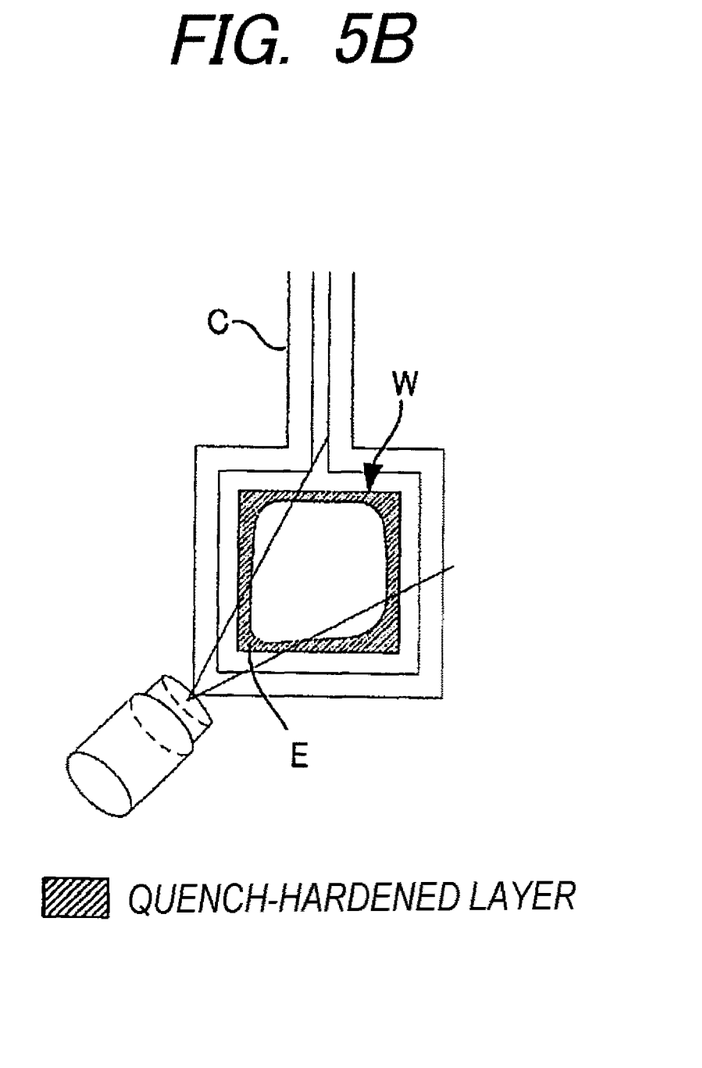
FIG. 5B is a diagram schematically illustrating another hardening pattern of a workpiece in a quenching process.

FIG. 5A illustrates a hardening pattern when cooling fluid is not sprayed to a heating target portion of a workpiece W. In the rectangular workpiece W having a rectangular cross-sectional shape, a corner E of the heating target portion is an easily overheated part and a hardened layer reaches a relatively deep part due to the overheating. On the other hand, by spraying the cooling fluid to the corner E in the form of mist as illustrated in FIG. 5B, the depth of the hardened layer of the corner E becomes smaller, that is, the overheating of the corner E is suppressed.

Figure 5C:
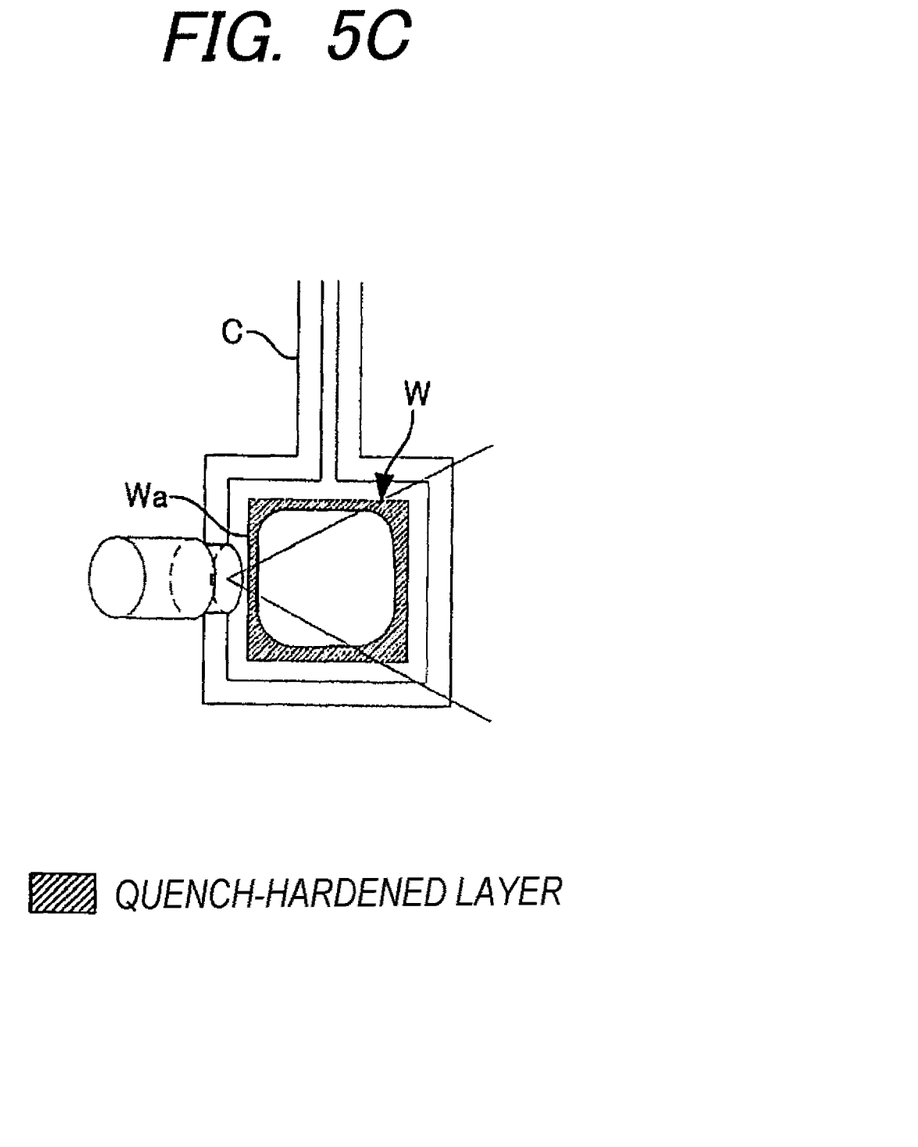
FIG. 5C is a diagram schematically illustrating another hardening pattern of a workpiece in a quenching process.
Figure 5D:
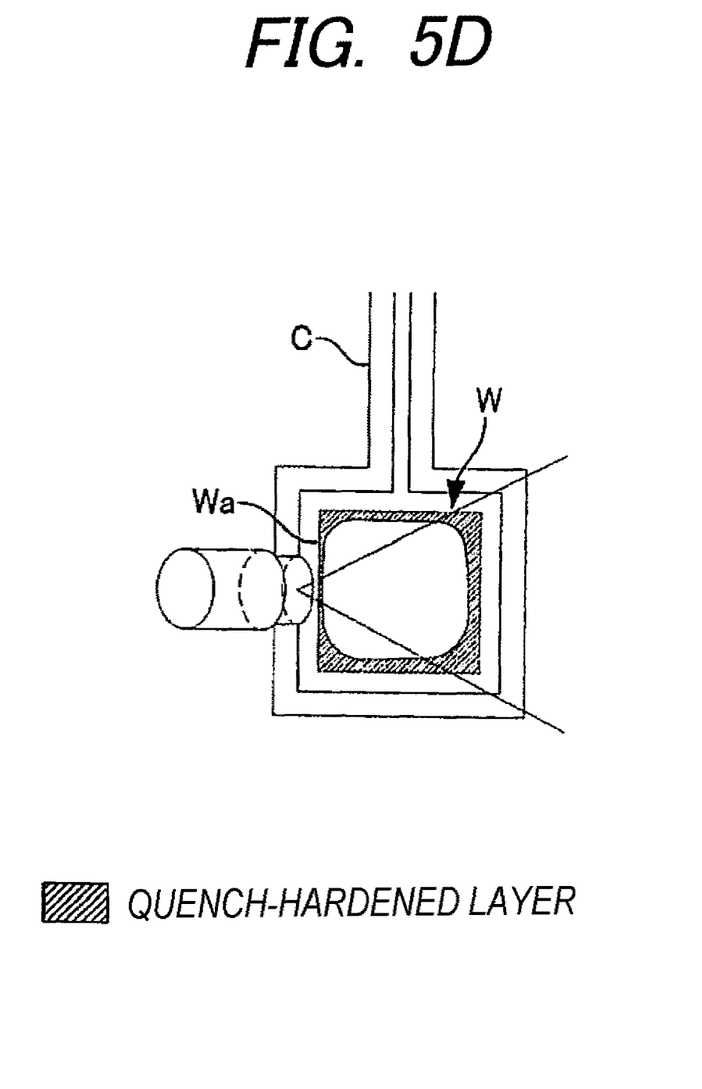
FIG. 5D is a diagram schematically illustrating another hardening pattern of a workpiece in a quenching process.

FIGS. 5C and 5D illustrate hardening patterns when the cooling fluid is sprayed to the side surface Wa in the form of mist. The example illustrated in FIG. 5D shows a hardening pattern when the sprayed amount of cooling fluid is greater than that in the example illustrated in FIG. 5C. As illustrated in FIGS. 5A, 5C, and 5D, the cooling of the side surface Wa is promoted with the increase in the sprayed amount of cooling fluid sprayed in the form of mist, and the depth of the hardened layer of the side surface Wa becomes smaller.

In this way, by adjusting the spray direction or the sprayed amount of the cooling fluid which has been sprayed in the form of mist, it is possible to prevent local overheating of the heating target portion of the workpiece W and to locally change heat treatment specifications. Accordingly, it is possible to save design of a coil shape or use of a magnetic shield for preventing overheating of an easily overheated part such as a corner. Even when the output of the heating apparatus has a frequency or power higher than an appropriate frequency or power in the relationship with the workpiece, it is possible to perform desired heat treatment and to perform heat treatment on the same kinds of workpieces having different sizes using a common coil. Accordingly, it is possible to reduce the manufacturing cost of the coil and to simplify the facilities.

For example, water can be suitably used as the liquid included in the cooling fluid and various additives may be included as the liquid from the viewpoint of controlling a cooling speed of the coil 10 or the heating target portion of the workpiece W. The cooling fluid may include a gas in addition to the liquid. By adding a gas to the cooling fluid, it is possible to raise the spray speed of the cooling fluid and thus to enhance the effect of removing burrs or bonderizing residues attached to the workpiece W or scales attached to the coil 10. Examples of the gas used for the cooling fluid include inert gases such as nitrogen gas or argon gas. It may be possible to prevent oxidation of the coil 10 or the workpiece W using an inert gas.

Figure 6:
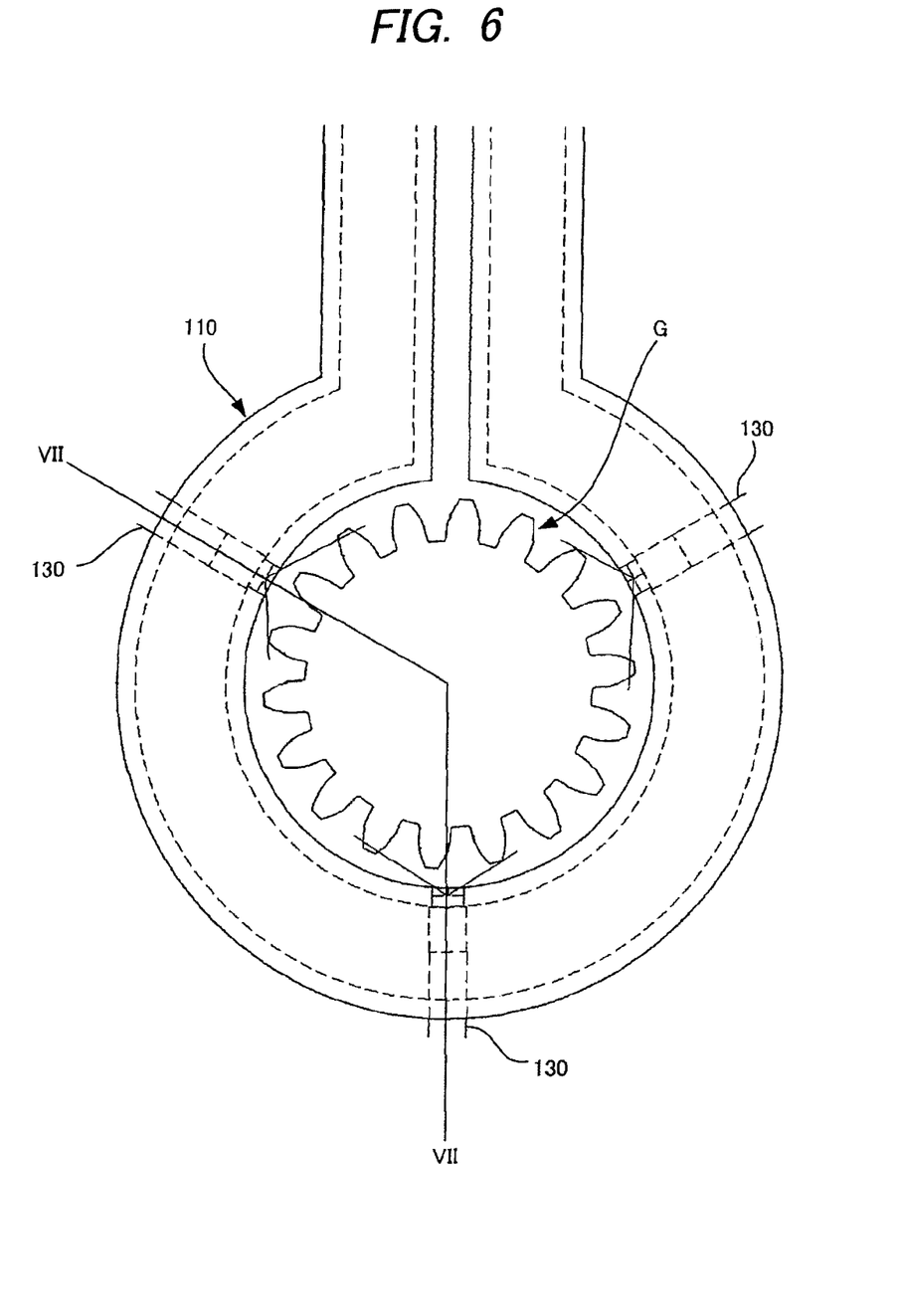
FIG. 6 is a diagram schematically illustrating a configuration of another example of a heating apparatus according to an embodiment of the invention.
Figure 7:
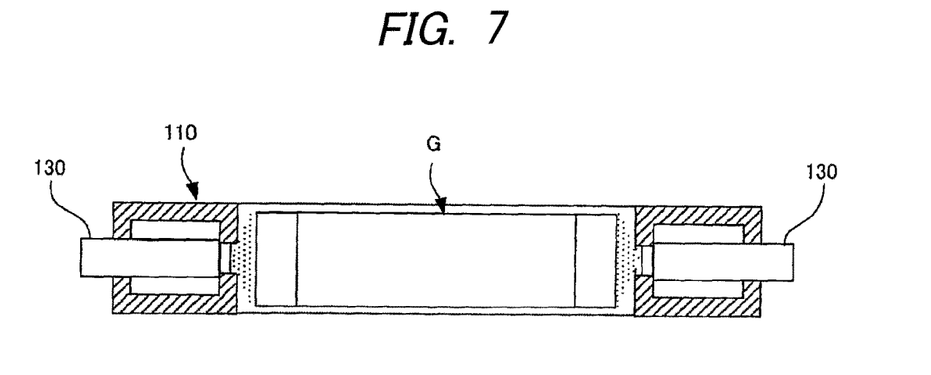
FIG. 7 is a cross-sectional view taken along the line VH-VH of FIG. 6.

FIGS. 6 and 7 are diagrams illustrating a configuration of another example of the heating apparatus according to the embodiment of the invention.

The heating apparatus illustrated in FIGS. 6 and 7 serves to inductively heat a toothed wheel G as a workpiece and includes a coil 110 and a spray unit having a nozzle 130 that sprays a cooling fluid including a liquid in the form of mist.

The coil 110 has an annular shape and is disposed to surround the outer circumference of the toothed wheel G. When a current flows in the coil 110, an eddy current circulating in the outer circumferential portion is generated in the toothed wheel G and tooth faces of the toothed wheel G are heated. In order to make the heating temperatures of the tooth faces of the toothed wheel G uniform, the coil 110 and the toothed wheel G relatively rotate in the period in which AC power is supplied to the coil 110.

In the illustrated example, plural nozzles 130 are formed at appropriate intervals in the circumferential direction of the coil 110, each nozzle 130 is disposed to penetrate the coil 110 in the radial direction, and the ejection orifices thereof are exposed to the inner circumferential surface of the coil 110.

The cooling fluid is sprayed in the form of mist from the nozzles 130 in at least a period in which AC power is supplied to the coil 110, and the particles of the sprayed cooling fluid are sprayed to the tooth faces of the toothed wheel G which is placed and heated in a magnetic field formed by the coil 110.

As described above, by adjusting the spray direction or the sprayed amount of the cooling fluid which has been sprayed in the form of mist, it is possible to adjust the heating temperatures of the parts of the heating target portion of the workpiece. Accordingly, it is possible to prevent corners of tooth tips, which are easily overheated, from being overheated and also to perform heat treatment on toothed wheel having different modules using a common coil.

While examples in which a workpiece is inductively heated while relatively moving a coil to the workpiece have been described above, the invention may be applied to stationary induction heating in which a coil and a workpiece are fixed.

Test Examples in which a cooling fluid is sprayed in the form of mist to the coil 10 and the heating target portion of the workpiece W in the heating apparatus 1 illustrated in FIG. 1 and cooling quality of the coil 10 and heat treatment quality of the workpiece W are verified will be described below.

Figure 8:
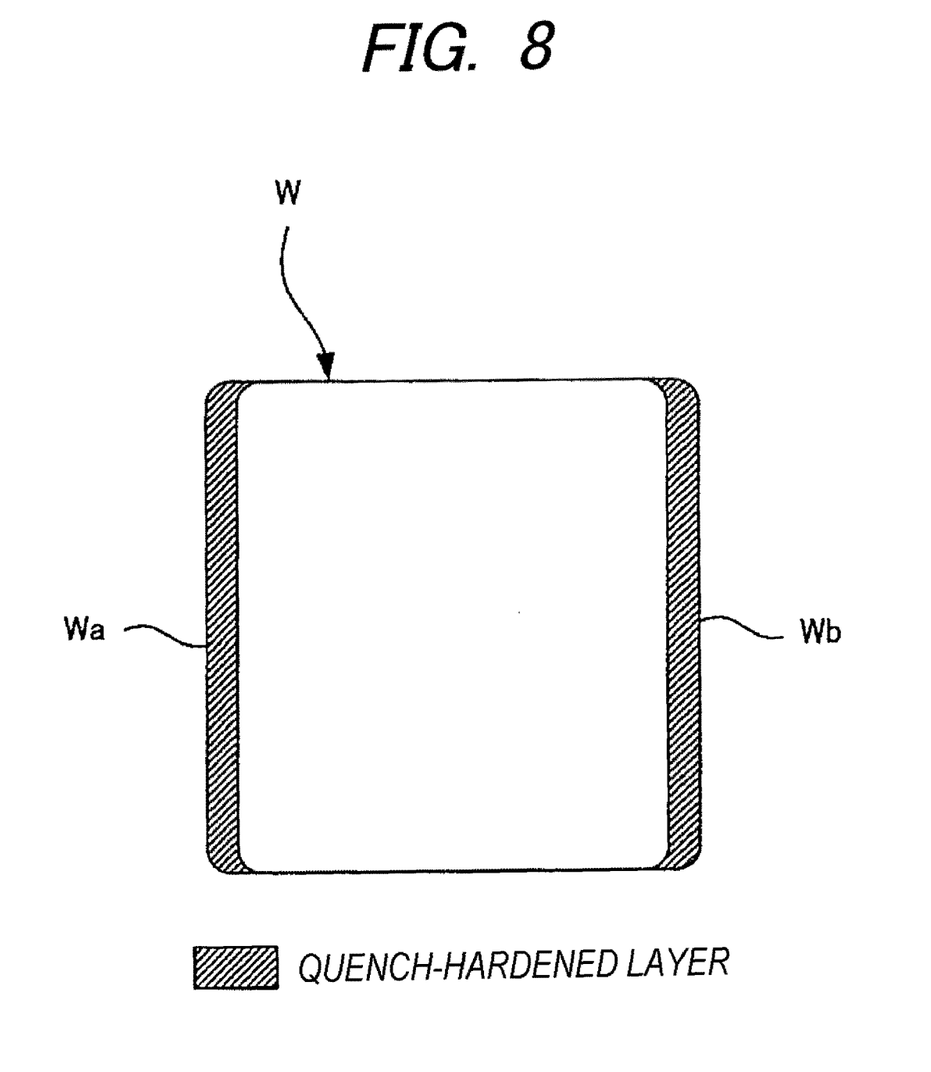
FIG. 8 is a diagram schematically illustrating a hardening pattern of a workpiece according to a test example.

In Test Examples 1 to 3, a quenching process was performed on both side surfaces Wa, Wb of the workpiece W using the heating apparatus 1, and a quenching coolant was sprayed to the workpiece W at a predetermined flow rate to cool the workpiece W on the downstream side of the coil 10 in the feeding direction of the workpiece W. Heating conditions of Test Examples 1 to 3 are described in Table 1, and hardening patterns of the workpiece W in Test Examples 1 to 3 are schematically illustrated in FIG. 8.

TABLE 1

| | Ex. 1 | Ex. 2 | Ex. 3 |
|---|---|---|---|
| Cooling fluid | Not sprayed | Sprayed | Sprayed |
| Set power (kW) | 50 | 50 | 80 |
| Oscillation frequency (kHz) | 25 | 25 | 25 |
| Workpiece feeding speed (mm/sec) | 80 | 80 | 120 |
| Coil coolant temperature (° C.) Supply port | 14 | 14 | 14 |
| Discharge port | 28 | 26 | 27 |
| Hardened layer depth (mm) | 1.8-2.1 | 1.8-1.9 | 1.7-1.9 |
| Crystal grain size (GSNo.) | 11.7 | 11.8 | 11.7 |

In regard to the cooling of the coil 10, a temperature difference between a supply port and a discharge port of a coil coolant flowing in the coil 10, that is, a degree of temperature rise of the coil coolant, was measured. In regard to the heat treatment quality of the workpiece W, the depth of hardened layer and the crystal grain size on the outer surface side in cross-sections of test pieces taken from the workpiece W were measured. The measurement results are also described in Table 1. The crystal grain size (GS No.) is a grain size number defined in JIS G 0551.

In regard to the cooling of the coil 10, in comparison with Test Example 1 in which the cooling fluid is not sprayed to the coil 10 and the heating target portion of the workpiece W, in Test Example 2 in which the cooling fluid is sprayed in the form of mist to the coil 10 and the heating target portion of the workpiece W under the same heating conditions as in Test Example 1, the degree of temperature rise of the coil coolant is smaller. In Test Example 3 in which the set power is higher than that in Test Example 1 and the cooling fluid is sprayed in the form of mist to the coil 10 and the heating target portion of the workpiece W, the degree of temperature rise is equivalent to that in Test Example 1. That is, it can be seen that the coil 10 is cooled by spraying the cooling fluid to the coil 10 and the heating target portion of the workpiece W in the form of mist.

In Test Example 1 in which the cooling fluid is not sprayed to the coil 10 and the heating target portion of the workpiece W, sparks were generated from the coil 10 at the point of time at which the workpiece W is processed by about 300 meters. However, in Test Examples 2 and 3 in which the cooling fluid is sprayed to the coil 10 and the heating target portion of the workpiece W, sparks were not generated from the coil 10 even when the workpiece W is processed by 10,000 meters.

In regard to the heat treatment quality of the workpiece W, in Test Example 2 in which the cooling fluid is sprayed to the coil 10 and the heating target portion of the workpiece W in the form of mist under the same heating conditions as in Test Example 1 in which the cooling fluid is not sprayed to the coil 10 and the heating target portion of the workpiece W, a depth of the hardened layer equivalent to that in Test Example 1 was obtained. In Test Example 3 in which the work feeding speed is higher than that in Test Example 1, in order to obtain the depth of the hardened layer equivalent to that in Test Example 1, it is necessary to heat the workpiece at a higher temperature by raising the set power, and crystal grains are typically coarsened by heating the workpiece at a higher temperature. However, in Test Example 3 in which the cooling fluid is sprayed to the coil 10 and the heating target portion of the workpiece W, the coarsening of crystal grains was suppressed.

This application is based on Japanese Patent Application Nos. 2014-142614 and 2014-142615 both filed on Jul. 10, 2014, the entire contents of which are incorporated herein by reference.

The invention claimed is:

1. A heating apparatus for heating an elongated workpiece, the heating apparatus comprising:
    a coil configured to receive AC power, the coil comprising
        a conductor portion configured to form a magnetic field that inductively heats the elongated workpiece; and
    a first nozzle configured to spray cooling fluid including a liquid to the coil in a form of mist at least during a period in which the AC power is supplied to the coil,
    wherein the first nozzle is provided at a location separated from the conductor portion of the coil and is arranged to spray the cooling fluid toward a gap between the coil and the elongated workpiece in the form of mist,
        wherein the coil is configured to inductively heat the elongated workpiece continuously in a linear direction in which the coil is moved relative to the elongated workpiece.

2. The heating apparatus according to claim 1, wherein the coil further comprises a core mounted on the conductor portion.

3. The heating apparatus according to claim 1, wherein the first nozzle is arranged to spray the cooling fluid in a direction orthogonal to a longitudinal axis of the coil in the form of mist.

4. The heating apparatus according to claim 3, further comprising a second nozzle disposed upstream from the coil with respect to the feeding direction of the elongated workpiece, wherein the second nozzle is arranged to spray cooling fluid to a gap between a first heating section of the coil and the elongated workpiece.

5. The heating apparatus according to claim 1, wherein the coil is configured to inductively heat the entire outer circumferential surface of the elongated workpiece.

6. The heating apparatus according to claim 1, further comprising a conveyor for feeding the elongated workpiece into the coil in a longitudinal direction of the elongated workpiece, wherein the coil is configured to inductively heat the entire outer circumferential surface of the elongated workpiece.

7. The heating apparatus according to claim 1, further comprising a second nozzle disposed upstream from the coil with respect to the feeding direction of the elongated workpiece,
    wherein the second nozzle is arranged to spray cooling fluid to an upstream gap between a first heating section of the coil and the elongated workpiece, and
    wherein the first nozzle is disposed downstream relative the second nozzle, and the first nozzle is positioned relative to the coil so that a central axis of the first nozzle is aligned in a direction that is orthogonal to a longitudinal axis of the coil so that cooling fluid can be sprayed toward the coil in the form of mist.

* * * * *